(12) United States Patent
Dung et al.

(10) Patent No.: US 11,580,362 B2
(45) Date of Patent: Feb. 14, 2023

(54) LEARNING APPARATUS, GENERATION APPARATUS, CLASSIFICATION APPARATUS, LEARNING METHOD, AND NON-TRANSITORY COMPUTER READABLE STORAGE MEDIUM

(71) Applicant: YAHOO JAPAN CORPORATION, Tokyo (JP)

(72) Inventors: Tran Dung, Tokyo (JP); Kenichi Iso, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 1190 days.

(21) Appl. No.: 16/130,355

(22) Filed: Sep. 13, 2018

(65) Prior Publication Data
US 2019/0122099 A1 Apr. 25, 2019

(30) Foreign Application Priority Data

Oct. 20, 2017 (JP) .............................. JP2017-203314

(51) Int. Cl.
| | | |
|---|---|---|
| *G06N 20/00* | (2019.01) | |
| *G06N 3/04* | (2023.01) | |
| *G06N 3/08* | (2023.01) | |
| *G10L 15/16* | (2006.01) | |

(52) U.S. Cl.
CPC ............. *G06N 3/0454* (2013.01); *G06N 3/08* (2013.01); *G06N 20/00* (2019.01); *G10L 15/16* (2013.01)

(58) Field of Classification Search
CPC ........ G06N 20/00; G06N 3/0454; G06N 3/08; G05B 13/027
See application file for complete search history.

(56) References Cited

U.S. PATENT DOCUMENTS

| | | | | |
|---|---|---|---|---|
| 4,918,618 A | * | 4/1990 | Tomlinson, Jr. .......... | G06N 3/08 708/801 |
| 5,161,014 A | * | 11/1992 | Pearson .................. | G06N 3/049 380/216 |

(Continued)

FOREIGN PATENT DOCUMENTS

JP 2017-182319 A 10/2017

OTHER PUBLICATIONS

He, Kaiming et al., "Deep Residual Learning for Image Recognition", Microsoft Research, https://arxiv.org/pdf/1512.03385.pdf, (Dec. 10, 2015), pp. 1-12.

(Continued)

*Primary Examiner* — Feng-Tzer Tzeng
(74) *Attorney, Agent, or Firm* — Oliff PLC

(57) ABSTRACT

According to one aspect of an embodiment a learning apparatus includes a first acquiring unit that acquires first output information that is output by an output layer when predetermined input information is input to a model that includes an input layer, a plurality of intermediate layers, and the output layer. The learning apparatus includes a second acquiring unit that acquires intermediate output information that is based on pieces of intermediate information that are output by the plurality of intermediate layers when the input information is input to the model. The learning apparatus includes a learning unit that learns the model based on the first output information and the intermediate output information.

16 Claims, 7 Drawing Sheets

(56) References Cited

U.S. PATENT DOCUMENTS

| | | | | |
|---|---|---|---|---|
| 5,182,794 A | * | 1/1993 | Gasperi | G06N 3/08 |
| | | | | 706/25 |
| 5,295,227 A | * | 3/1994 | Yokono | G06K 9/62 |
| | | | | 706/28 |
| 5,390,284 A | * | 2/1995 | Ogata | G06N 3/08 |
| | | | | 706/25 |
| 2002/0087221 A1 | * | 7/2002 | Keeler | G05B 13/027 |
| | | | | 700/48 |
| 2016/0162781 A1 | * | 6/2016 | Llicrap | G06N 3/0454 |
| | | | | 706/25 |

OTHER PUBLICATIONS

Oct. 16, 2018 Office Action issued in Japanese Patent Application No. 2017-203314.
Feb. 26, 2019 Office Action issued in Japanese Patent Application No. 2017-203314.

* cited by examiner

| LEARNING DATA ID | INPUT INFORMATION | TARGET OUTPUT INFORMATION | ... |
|---|---|---|---|
| ID#1 | INPUT INFORMATION #1 | TARGET OUTPUT INFORMATION #1 | ... |
| ID#2 | INPUT INFORMATION #2 | TARGET OUTPUT INFORMATION #2 | ... |
| ... | ... | ... | ... |

FIG.5

| MODEL | WER |
|---|---|
| DNN (2048x7) | 21.3 |
| DNN (1024x7) | 21.1 |
| DNN (848x7) + 1 EXTRACTION BLOCK | 20.7 |
| DNN (848x7) + 2 EXTRACTION BLOCKS | 20.4 |
| DNN (848x7) + 3 EXTRACTION BLOCKS | 20.4 |
| DNN (1024x7) + SKIP CONNECTION | 22.0 |
| DNN (1024x7) + COMBINE FEATURES AT ALL LEVEL | 21.0 |

FIG.6

| MODEL | WER |
|---|---|
| bLSTM BASELINE | 20.8 |
| bLSTM + 1 EXTRACTION BLOCK | 20.4 |
| bLSTM + 2 EXTRACTION BLOCKS | 19.9 |

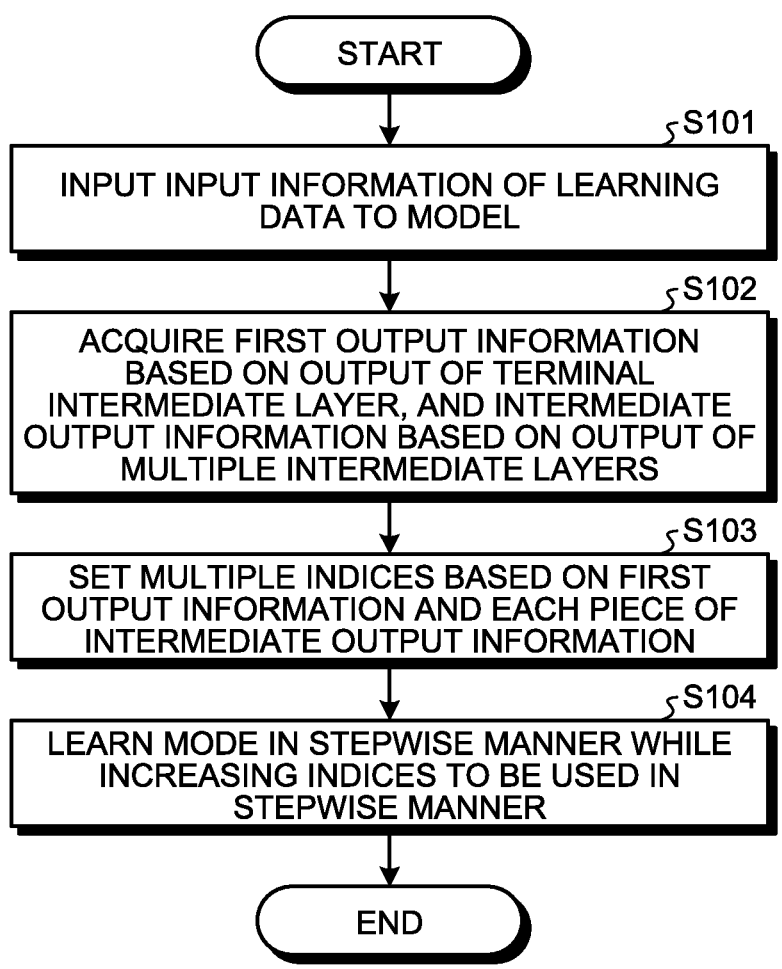

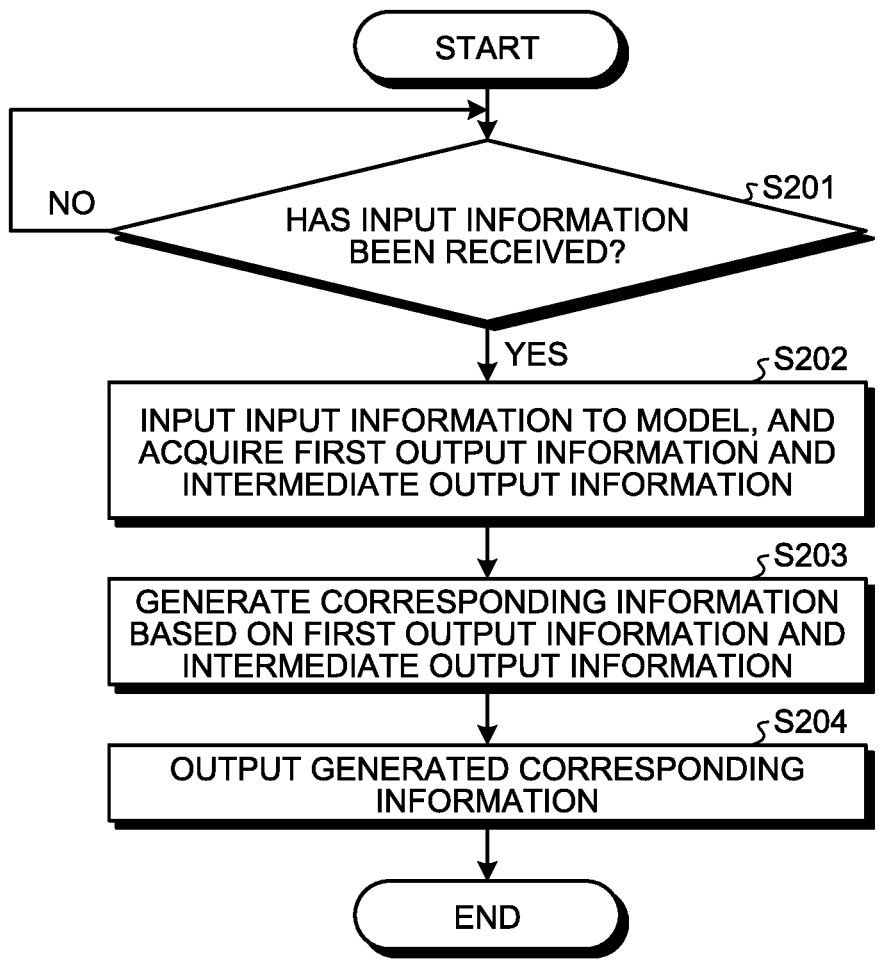

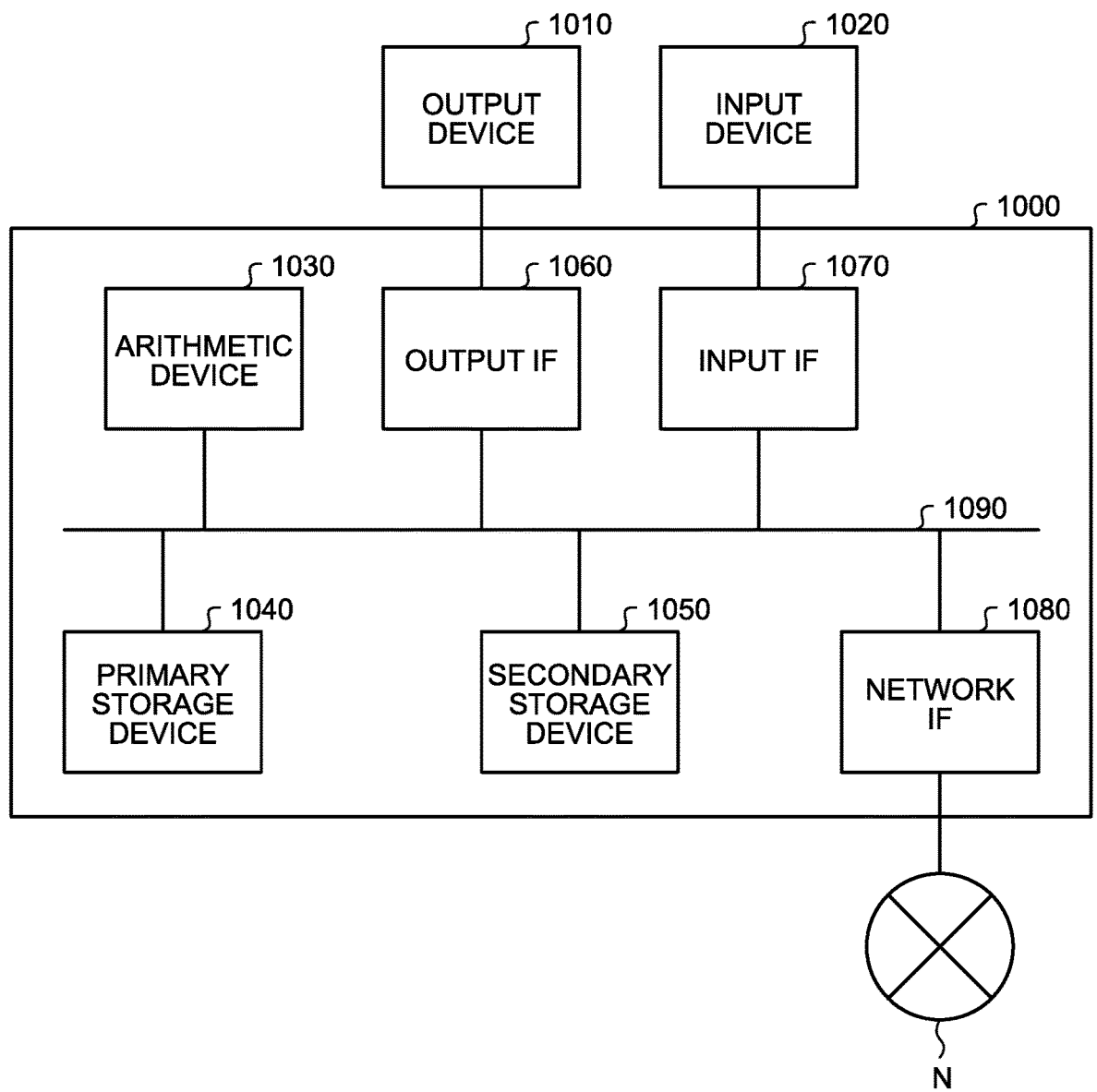

LEARNING APPARATUS, GENERATION APPARATUS, CLASSIFICATION APPARATUS, LEARNING METHOD, AND NON-TRANSITORY COMPUTER READABLE STORAGE MEDIUM

CROSS-REFERENCE TO RELATED APPLICATIONS

The present application claims priority to and incorporates by reference the entire contents of Japanese Patent Application No. 2017-203314 filed in Japan on Oct. 20, 2017.

BACKGROUND OF THE INVENTION

1. Field of the Invention

The present invention relates to a learning apparatus, a generation apparatus, a classification apparatus, a learning method, a computer-readable recording medium having stored therein a learning program, and a model.

2. Description of the Related Art

Conventionally, a technology for realizing various processes by using a deep neural network (DNN) including neurons (hereinafter, may be described as "nodes") that are connected in a multistage manner has been known. For example, the DNN as described above includes a plurality of intermediate layers that are connected in series, extracts features included in input information by changing the number of dimensions of the information by each of the intermediate layers, and outputs output information corresponding to the extracted features. As one example of a technology using the DNN as described above, there is a known technology for a skip connection to collectively use pieces of information output by the intermediate layers to thereby improve accuracy of output information.

Non Patent Literature 1: "Deep Residual Learning for Image Recognition", Kaiming He, Xiangyu Zhang, Shaoqing Ren, Jian Sun <Internet> https://arxiv.org/pdf/1512.03385.pdf However, in the conventional technology, it is not always possible to improve accuracy of output information.

For example, in the conventional technology as described above, the DNN is learned by correcting a connection coefficient between the nodes such that output information to be output by the DNN when predetermined input information is input approaches desired information. However, in the learning method as described above, only a single index is used to correct the connection coefficient; therefore, it may be difficult to improve accuracy of learning of the DNN.

SUMMARY OF THE INVENTION

It is an object of the present invention to at least partially solve the problems in the conventional technology.

According to one aspect of an embodiment a learning apparatus includes a first acquiring unit that acquires first output information that is output by an output layer when predetermined input information is input to a model that includes an input layer, a plurality of intermediate layers, and the output layer. The learning apparatus includes a second acquiring unit that acquires intermediate output information that is based on pieces of intermediate information that are output by the plurality of intermediate layers when the input information is input to the model. The learning apparatus includes a learning unit that learns the model based on the first output information and the intermediate output information.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a first diagram illustrating an example of an effect of the learning process according to the embodiment;

FIG. 6 is a second diagram illustrating an example of the effect of the learning process according to the embodiment;

FIG. 7 is a flowchart illustrating an example of the flow of the learning process performed by the information providing apparatus according to the embodiment;

FIG. 8 is a flowchart illustrating an example of the generation process performed by the information providing apparatus according to the embodiment; and FIG. 9 is a diagram illustrating an example of a hardware configuration.

DETAILED DESCRIPTION OF THE PREFERRED EMBODIMENTS

Modes (hereinafter, referred to as "embodiments") for carrying out a learning apparatus, a generation apparatus, a classification apparatus, a learning method, and a non-transitory computer readable storage medium according to the present application will be described in detail below with reference to the drawings. The learning apparatus, the generation apparatus, the classification apparatus, the learning method, and the non-transitory computer readable storage medium according to the present application are not limited by the embodiments below. The embodiments may be combined appropriately as long as processes do not conflict with each other. In the following embodiments, the same components are denoted by the same reference signs, and the same explanation will be omitted.

1. Overview of Information Providing Apparatus

Figure 1:
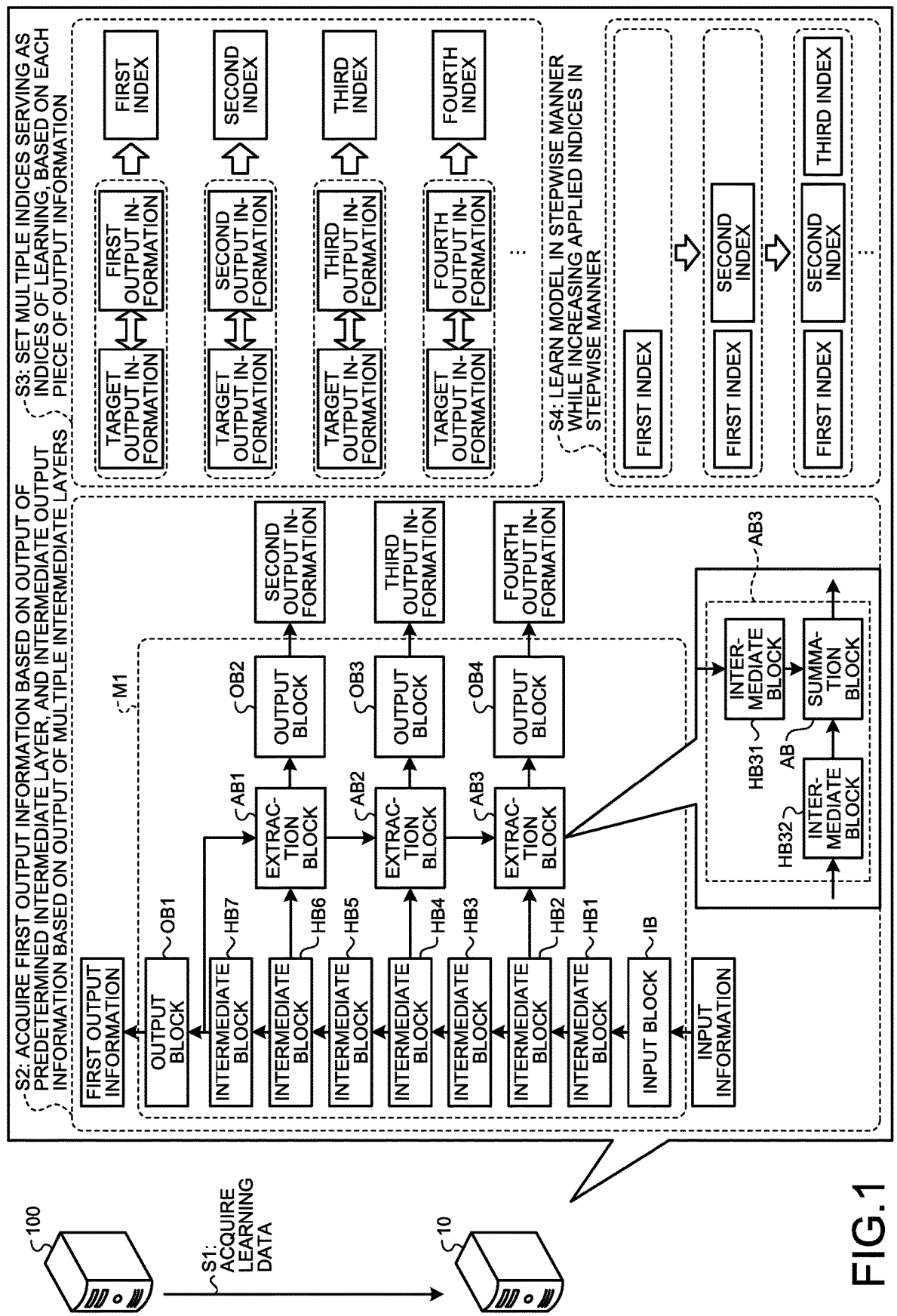
FIG. 1 is a diagram illustrating an example of a learning process performed by an information providing apparatus according to an embodiment.
Figure 2:
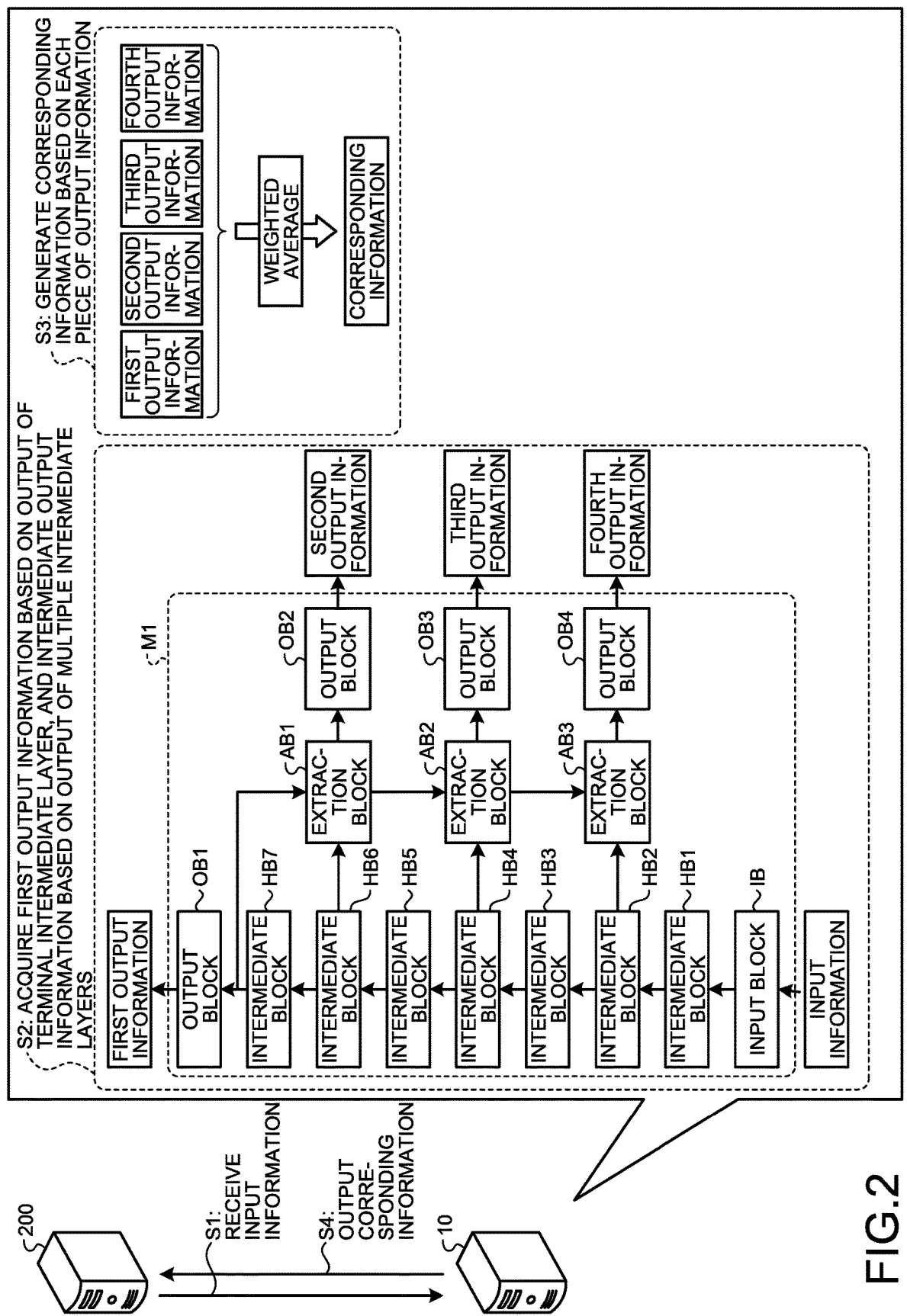
FIG. 2 is a diagram illustrating an example of a generation process performed by the information providing apparatus according to the embodiment.

First, one example of a learning process and a generation process performed by an information providing apparatus that is one example of a learning apparatus, a generation apparatus, and a classification apparatus will be described with reference to FIG. 1 and FIG. 2. FIG. 1 is a diagram illustrating an example of the learning process performed by the information providing apparatus according to the embodiment. FIG. 2 is a diagram illustrating an example of the generation process performed by the information providing apparatus according to the embodiment. In FIG. 1 and FIG. 2, an information providing apparatus 10 is an information processing apparatus that performs the learning process and the generation process as described below, and is implemented by, for example, a server apparatus, a cloud system, or the like.

Figures 3, 4:
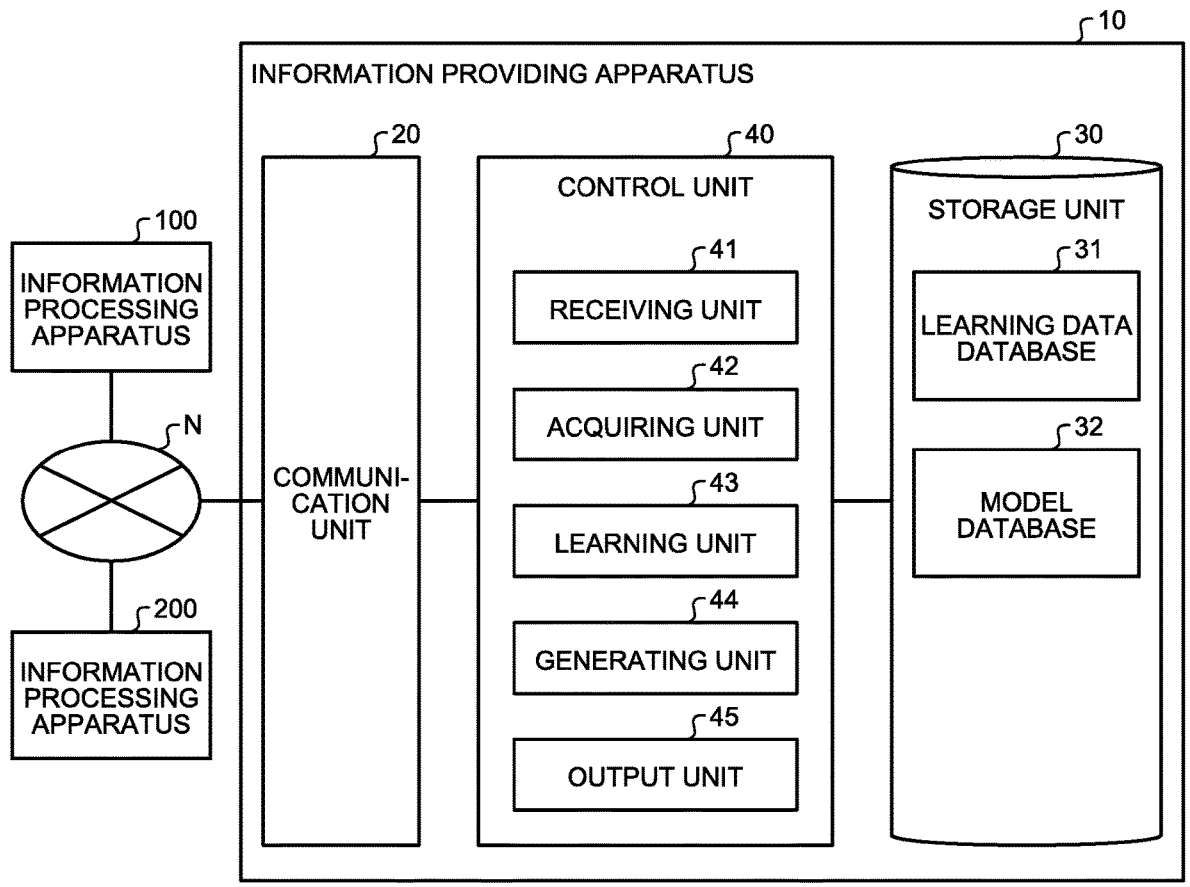
FIG. 3 is a diagram illustrating a configuration example of the information providing apparatus according to the embodiment.
FIG. 4 is a diagram illustrating an example of information registered in a learning data database according to the embodiment.

For example, the information providing apparatus 10 is able to communicate with information processing apparatuses 100 and 200 used by arbitrary users, via a predetermined network N, such as the Internet (for example, see FIG. 3). For example, the information providing apparatus 10 transmits and receives various kinds of data to and from the information processing apparatuses 100 and 200.

The information processing apparatuses 100 and 200 are implemented by information processing apparatuses including smart devices, such as smartphones or tablets, desktop personal computers (PCs), notebook PCs, and server apparatuses, and capable of providing various kinds of arbitrary information, such as learning data used for learning a model and input information to be a target of the generation process, to the information providing apparatus 10.

The information providing apparatus 10 learns a model that classifies input information and performs a process depending on a classification result, on the basis of features included in various kinds of input information. In this example, the model is implemented by a multi-stage neural network that includes an input layer including a plurality of nodes, an intermediate layer (hidden layer), and an output layer. In the following description, an example will be described in which the information providing apparatus 10 learns a model that is a deep neural network (DNN) having a plurality of intermediate layers; however, the embodiments are not limited to this example. For example, the information providing apparatus 10 may learn, as a model, an arbitrary neural network as long as the neural network is a network, such as a convolutional neural network (CNN), a recurrent neural network (RNN), or a long short-term memory (LSTM), which includes a plurality of intermediate layers.

When various kinds of input information are input via the input layer, the model as described above performs a process of extracting features included in the input information by the plurality of intermediate layers. More specifically, the model includes a plurality of intermediate layers that are connected in series, and the intermediate layers sequentially perform various processes on the input information. Then, the model outputs, as output information, various processing results, such as classification results, that are based on the information output by the intermediate layers, via the output layer. The model as described above corrects a connection coefficient between the nodes such that desired output information is to be output when predetermined input information is input, and learns features included in the input information. The learning as described above may be realized using a back-propagation method or the like.

1-1. Learning Process

In the conventional learning process, a connection coefficient is corrected by using, as an index of the learning, an error or cross entropy between output information that is actually output by the model upon input of predetermined input information and desired output information. In other words, in the conventional learning process, the model is learned by adopting, as an objective function, a cross entropy function of the output information that is actually output by the model and the desired output information, differentiating the objective function, and updating the connection coefficient between the nodes with a differential coefficient. However, when the model is learned using a single index as described above, in some cases, it may be difficult to improve accuracy of output information.

To cope with this situation, the information providing apparatus 10 performs a learning process as described below. First, the information providing apparatus 10 acquires first output information that is to be output by an output layer when predetermined input information is input to a model that includes an input layer, a plurality of intermediate layers, and the output layer. Further, the information providing apparatus 10 acquires intermediate output information that is based on pieces of intermediate information that are output by the plurality of intermediate layers when the input information is input to the model. Then, the information providing apparatus 10 learns the model based on the first output information and the intermediate output information.

For example, the information providing apparatus 10 acquires, as the first output information, information that is output by the output layer when predetermined input information is input to the model. Further, the information providing apparatus 10 acquires one or a plurality of pieces of intermediate output information based on intermediate information that is output by a predetermined intermediate layer among the intermediate layers when the predetermined input information is input to the model, and based on intermediate information that is output by an intermediate layer disposed closer to the input layer than the predetermined intermediate layer.

The intermediate output information as described above may be used as an index for learning of the model. Therefore, the information providing apparatus 10 sets a plurality of indices used for learning of the model on the basis of the first output information and the intermediate output information, and learns the model in a stepwise manner based on the plurality of indices. For example, the information providing apparatus 10 learns the model using a first index that is based on target output information corresponding to the input information and based on the first output information, and thereafter learns the model using a second index that is based on the target output information and the intermediate output information.

Further, the information providing apparatus 10 may generate a third index and a fourth index on the basis of a plurality of pieces of intermediate output information, and learn the model in a stepwise manner by using the generated indices in a stepwise manner. For example, the information providing apparatus 10 may perform a series of processes of selecting an intermediate layer, setting an index based on intermediate information output by the selected intermediate layer, and learning the model using the set index, while selecting each of intermediate layers in a stepwise manner in order from a predetermined intermediate layer to an intermediate layer on the input layer side, to thereby learn the model in a stepwise manner.

As described above, the information providing apparatus 10 acquires not only the first output information but also the intermediate output information that is based on the intermediate information output by the intermediate layer, and learns the model based on the first output information and the intermediate output information. Therefore, the information providing apparatus 10 is able to expand the index used for learning of the model, so that it is possible to improve accuracy of learning of the model. Consequently, it is possible to improve accuracy of output information.

1-2. Example of Learning Process

An example of a learning process performed by the information providing apparatus 10 will be described below with reference to FIG. 1. In the example in FIG. 1, a case will be described in which second output information to fourth output information are acquired as pieces of intermediate output information; however, the embodiments are not limited to this example. It is possible to learn the model based on an arbitrary number of pieces of intermediate output information.

In this example, the information providing apparatus 10 generates, in advance, a model M1 that is to be learned. For example, the information providing apparatus 10 generates the model M1 that includes an input block IB that has an input layer for receiving input of input information, a plurality of intermediate blocks HB1 to HB7 (hereinafter, may be collectively referred to as an "intermediate block HB"), and an output block OB1 that outputs the first output information. In this example, the input block IB includes the input layer that, upon receiving input of input information, outputs information corresponding to the input information to the intermediate block HB1. Further, the intermediate block HB includes a plurality of intermediate layers that, upon receiving intermediate information output by the input block IB in the preceding state or the intermediate block HB in the preceding stage, performs various kinds of arithmetic processing on the received intermediate information. Furthermore, the output block OB1 includes an output layer that outputs the first output information based on output of the intermediate block HB7. For example, the output block OB1 includes an output layer that applies a softmax function to a plurality of values output by the intermediate block HB7.

In other words, the model M1 is a model that includes an input layer (i.e., the input block IB) that receives input information, a plurality of intermediate layers (i.e., layers included in the plurality of intermediate blocks HB) that perform various kinds of arithmetic processing based on output from the layer in the preceding stage, and an output layer (i.e., the output block OB1) that outputs the first output information based on results of various kinds of arithmetic processing that are sequentially performed by the intermediate layers.

For example, upon receiving a 429-dimensional vector, the intermediate block HB performs arithmetic processing based on the value of each of the dimensions of the received vector, and outputs the 429-dimensional vector as intermediate information to the intermediate block HB or the output block OB1 in the subsequent stage. While the model M1 including the seven intermediate blocks HB1 to HB7 is illustrated in the example in FIG. 1, the embodiments are not limited to this example. In other words, the information providing apparatus 10 may generate the model M1 including an arbitrary number of intermediate blocks HB.

Furthermore, the information providing apparatus 10 generates the model M1 that includes a plurality of extraction blocks AB1 to AB3, each of which extracts output information of an intermediate layer disposed closest to the output layer (hereinafter, this intermediate layer may be described as a "terminal intermediate layer") and output information of an intermediate layer disposed closer to the input layer than the terminal intermediate layer, and generates new intermediate information based on the pieces of extracted information. Moreover, the information providing apparatus 10 generates the model M1 that includes a plurality of output blocks OB2 to OB4, each of which outputs intermediate output information based on the pieces of intermediate information output by the extraction blocks AB1 to AB3.

For example, the extraction block AB1 acquires output information output by the terminal intermediate layer, i.e., intermediate information output by the intermediate block HB7, acquires intermediate information output by the intermediate block HB6 disposed closer to the input layer than the intermediate block HB7, and generates new intermediate information based on the pieces of acquired intermediate information. Then, the output block OB2 generates the second output information based on the intermediate information generated by the extraction block AB1.

Further, for example, the extraction block AB2 generates intermediate information that is based on intermediate information output by the intermediate block HB7, based on intermediate information output by the intermediate block HB6 disposed closer to the input layer than the intermediate block HB7, and based on intermediate information output by the intermediate block HB4 disposed closer to the input layer than the intermediate block HB6. More specifically, the extraction block AB2 generates new intermediate information based on the intermediate information generated by the extraction block AB1 and the intermediate information output by the intermediate block HB4. Then, the output block OB3 generates the third output information based on the intermediate information generated by the extraction block AB2.

Furthermore, for example, the extraction block AB3 generates intermediate information that is based on intermediate information output by the intermediate block HB7, based on intermediate information output by the intermediate block HB6 disposed closer to the input layer than the intermediate block HB7, based on intermediate information output by the intermediate block HB4 disposed closer to the input layer than the intermediate block HB6, and based on intermediate information output by the intermediate block HB2 disposed closer to the input layer than the intermediate block HB4. More specifically, the extraction block AB3 generates new intermediate information based on the intermediate information generated by the extraction block AB2 and the intermediate information output by the intermediate block HB2. Then, the output block OB4 generates the fourth output information based on the intermediate information generated by the extraction block AB3.

The extraction blocks AB1 to AB3 may be configured in an arbitrary manner as long as they generate new intermediate information based on each piece of extracted intermediate information. For example, each of the extraction blocks AB1 to AB3 may include two intermediate blocks that perform predetermined processing on each piece of extracted intermediate information, and a summation block that outputs a sum of the pieces of intermediate information output by the intermediate blocks.

For example, in the example illustrated in FIG. 1, the extraction block AB3 includes an intermediate block HB31 that converts the number of dimensions of the intermediate information output by the extraction block AB2 to a predetermined number of dimensions, an intermediate block HB32 that converts the number of dimensions of the intermediate information output by the intermediate block HB2 to a predetermined number of dimensions, and a summation block AB that adds up the pieces of intermediate information output by the intermediate blocks HB31 and HB32. More specifically, the summation block AB generates a synthetic vector of the multi-dimensional vectors output by the intermediate blocks HB31 and HB32.

When the number of dimensions of the intermediate information output by the extraction block AB2 and the number of dimensions of the intermediate information output by the intermediate block HB2 are the same, the extraction block AB3 may include only the summation block AB without including the intermediate blocks HB31 and HB32. Further, the extraction blocks AB1 and AB2 have the same configurations as the extraction block AB3. For example, the extraction block AB1 includes an intermediate block that converts the number of dimensions of the intermediate information output by the intermediate block HB7 to a predetermined number of dimensions, an intermediate block that converts the number of dimensions of the intermediate information output by the intermediate block HB6 to a predetermined number of dimensions, and a summation block that adds up the pieces of intermediate information output by the intermediate blocks. Furthermore, the extraction block AB2 includes an intermediate block that converts the number of dimensions of the intermediate information output by the extraction block AB1 to a predetermined number of dimensions, an intermediate block that converts the number of dimensions of the intermediate information output by the intermediate block HB4 to a predetermined number of dimensions, and a summation block that adds up the pieces of intermediate information output by the intermediate blocks.

When the model M1 as described above is generated, the information providing apparatus 10 acquires learning data from the information processing apparatus 100 (Step S1). Then, the information providing apparatus 10 learns the model M1 using the acquired learning data. For example, the information providing apparatus 10 inputs input information, which is acquired as the learning data, to the model M1, and acquires first output information, which is based on output of a predetermined intermediate layer, and intermediate output information, which is based on output of the plurality of intermediate layers (Step S2).

For example, the information providing apparatus 10 acquires the first output information, the second output information, the third output information, and the fourth output information by inputting input information serving as learning data to the model M1 as described above. In other words, the information providing apparatus 10 acquires a piece of intermediate information output by the terminal intermediate layer, and a plurality of pieces of intermediate output information based on pieces of intermediate information output by a plurality of other intermediate layers.

Subsequently, the information providing apparatus 10 sets a plurality of indices that serve as indices of learning, on the basis of each piece of the output information (Step S3). For example, the information providing apparatus 10 adopts, as target output information, output information that is desired to be output by the model M1 when input information is input to the model M1. Then, the information providing apparatus 10 sets a first index that is cross entropy between the target output information and the first output information. Further, the information providing apparatus 10 sets a second index that is cross entropy between the target output information and the second output information. Furthermore, the information providing apparatus 10 sets a third index that is cross entropy between the target output information and the third output information. The information providing apparatus 10 may set a fourth index that is cross entropy between the target output information and the fourth output information.

Then, the information providing apparatus 10 learns the model M1 in a stepwise manner while increasing the applied indices in a stepwise manner (Step S4). More specifically, the information providing apparatus 10 adopts, as a learning target range, the input block IB, the intermediate blocks HB1 to HB7, and the output block OB1 that are included in the model M1, and corrects a connection coefficient between the nodes included in the learning target range on the basis of the objective functions.

For example, the information providing apparatus 10 sets the first index as a first objective function, and corrects the connection coefficient in the learning target range such that a value of the first objective function is minimized. Subsequently, the information providing apparatus 10 sets a sum of the first index and the second index as a second objective function, and corrects the connection coefficient in the learning target range such that a value of the second objective function is minimized. Subsequently, the information providing apparatus 10 sets a sum of the first index, the second index, and the third index as a third objective function, and corrects the connection coefficient in the learning target range such that a value of the third objective function is minimized. The information providing apparatus 10 may subsequently set a sum of the first index to the fourth index as a fourth objective function, and correct the connection coefficient in the learning target range such that a value of the fourth objective function is minimized.

In other words, the information providing apparatus 10 calculates, as each of the first index to the fourth index, cross entropy between the target output information and each of the first output information to the fourth output information. Then, the information providing apparatus 10 learns the model M1 while increasing, in a stepwise manner, items of the objective functions, which are cross entropy functions, by sequentially adopting an objective function of only the first index, an objective function of the sum of the first index and the second index, an objective function of the sum of the first index to the third index, and an objective function of the sum of the first index to the fourth index, in this order. In other words, the information providing apparatus 10 performs, in a stepwise manner, learning using only the first index, learning using only a combination of the first index and the second index, learning using only the first index to the third index, and learning using all of the first index to the fourth index. In this manner, the information providing apparatus 10 increases, in a stepwise manner, the indices to be used, and corrects the connection coefficient in the learning target range by eventually using all of the indices.

For example, the information providing apparatus 10 acquires the second output information that is based on the intermediate information output by the terminal intermediate layer and based on the intermediate information output by the first intermediate layer disposed closer to the input layer than the terminal intermediate layer, and acquires the third output information that is based on the intermediate information output by the terminal intermediate layer, based on the intermediate information output by the first intermediate layer, and based on the intermediate information output by the second intermediate layer disposed closer to the input layer than the first intermediate layer. Then, the information providing apparatus 10 learns the model M1 in a stepwise manner on the basis of the first output information, the second output information, and the third output information. For example, the information providing apparatus 10 generates at least the first index based on the first output information, the second index based on the second output information, and the third index based on the third output information, and learns the model in a stepwise manner by using the first index, the second index, and the third index in a stepwise manner.

Further, the information providing apparatus 10 learns the model M1 in a stepwise manner by increasing, in a stepwise manner, the number of objective functions to be used, by sequentially adopting the first index that is based on the intermediate information output by the terminal intermediate layer, the second index that is based on the intermediate information output by the intermediate block HB6 disposed closer to the input layer than the terminal intermediate layer, the third index that is based on the intermediate information output by the intermediate block HB4 disposed closer to the input layer than the intermediate block HB6, and the fourth index that is based on the intermediate information output by the intermediate block HB2 disposed closer to the input layer than the intermediate block HB4, in this order.

In this manner, the information providing apparatus 10 performs learning of the model M1 in a multistage manner by using, in a stepwise manner, a plurality of features that are included in certain input information and that have different resolutions (i.e., multi-resolutional features). As a result of the process as described above, the information providing apparatus 10 is able to improve accuracy of the model M1 in a stepwise manner by using a plurality of objective functions.

1-3. Variations of Learning Process

The learning process as described above is one example, and the embodiments are not limited to this example. Variations of the learning process performed by the information providing apparatus 10 will be described below.

1-3-1. Intermediate Block

In the learning process as described above, the example has been described in which the plurality of intermediate blocks HB1 to HB7 are provided, and a process of generating pieces of intermediate output information (the second output information to the fourth output information) is performed based on pieces of intermediate information output by the intermediate blocks HB7, HB6, HB4, and HB2. However, the embodiments are not limited to this example. For example, the information providing apparatus 10 may acquire a plurality of pieces of intermediate output information based on pieces of intermediate information output by arbitrary intermediate blocks HB, and learn the model M1 in a stepwise manner based on the pieces of acquired intermediate output information.

As a concrete example, the information providing apparatus 10 may generate the second output information based on the pieces of intermediate information output by the intermediate blocks HB5 and HB6, and generate the third output information based on the pieces of intermediate information output by the intermediate blocks HB4, HB5, and HB6. In other words, the information providing apparatus 10 may generate the intermediate output information by using the intermediate information that is output by a predetermined intermediate layer other than the terminal intermediate layer and by using the intermediate information that is output by an intermediate layer disposed closer to the input layer than the predetermined intermediate layer. Further, the information providing apparatus 10 may learn the model M1 in a stepwise manner by using a plurality of pieces of intermediate output information in a stepwise manner, in order from the intermediate output information that is based on the intermediate information output by the intermediate layer disposed closest to the output layer.

Furthermore, the information providing apparatus 10 does not necessarily have to include the intermediate blocks HB1 to HB7. In other words, the information providing apparatus 10 may acquire the intermediate output information based on the intermediate information output by an arbitrary intermediate layer among a plurality of intermediate layers other than the input layer and the output layer. In this case, the information providing apparatus 10 may acquire the intermediate output information from a plurality of pieces of intermediate information with different number of dimensions, for example.

For example, the extraction block AB1 may use intermediate information with a first number of dimensions and intermediate information with a second number of dimensions to generate the second output information with a third number of dimensions. In this case, the extraction block AB2 may use the intermediate information with the third number of dimensions output by the extraction block AB1 and intermediate information with a fourth number of dimensions to generate the third output information with a fifth number of dimensions. In other words, the information providing apparatus 10 may perform the learning process based on arbitrary intermediate information output by an arbitrary intermediate layer, as long as the model M1, which includes the input layer, the plurality of intermediate layers, and the output layer, acquires a plurality of pieces of intermediate output information based on intermediate information output by any of the intermediate layers, and the model M1 is learned in a stepwise manner using the plurality of acquired intermediate output information.

The information providing apparatus 10 may generate intermediate output information in each stage from arbitrary intermediate information. For example, the information providing apparatus 10 may input pieces of intermediate information output by the intermediate block HB7 and the intermediate block HB3 to the extraction block AB1, and adopt output from the extraction block AB1 as the second output information. Further, the information providing apparatus 10 may generate the third output information from the output of the extraction block AB1 and the output information of the extraction block HB5. In other words, the information providing apparatus 10 may set arbitrary intermediate output information using an arbitrary combination of pieces of intermediate information output by arbitrary intermediate layers.

1-3-2. Output Information to be Used

In the explanation described above, the information providing apparatus 10 acquires a plurality of pieces of intermediate output information, and learns the model M1 based on the plurality of pieces of acquired intermediate output information. However, the embodiments are not limited to this example.

For example, the information providing apparatus 10 may acquire a single piece of intermediate output information, and learn the model M1 in a stepwise manner based on the first output information and the intermediate output information. As a concrete example, the information providing apparatus 10 may acquire four pieces of intermediate information output by the intermediate blocks HB2, HB4, HB6, and HB7, acquire only the fourth output information based on intermediate information that is obtained by synthesizing the four pieces of acquired intermediate information, and learn the model M1 using the first output information and the fourth output information. Further, for example, the information providing apparatus 10 may generate the model M1 that does not include the output blocks OB2 and OB3 of the model M1 illustrated in FIG. 1, and learn the model M1 using the first output information and the fourth output information.

Furthermore, the information providing apparatus 10 may learn the model M1 based on an arbitrary number of pieces of intermediate output information. For example, the information providing apparatus 10 may learn the model M1 based on five or more pieces of intermediate output information. Moreover, the information providing apparatus 10 may learn the model M1 without using the first output information output by the output block OB1.

1-3-3. Objective Function to be Set

The information providing apparatus 10 may set indices with arbitrary contents as long as a plurality of indices are set based on the intermediate output information and the model M1 is learned in a stepwise manner based on the plurality of indices. For example, the information providing apparatus 10 may set indices based on, for example, an error between the target output information and the first output information, other than the cross entropy function between the target output information and the first output information, and learn the model M1 so as to minimize the set indices.

Furthermore, the information providing apparatus 10 may set a first index that minimizes an error between the target output information and the first output information, a second index that minimizes an error between the first output information and the second output information, a third index that minimizes an error among the first output information to the third output information, and a fourth index that minimizes an error among the first output information to the fourth output information. Moreover, the information providing apparatus 10 may set an objective function that minimizes an error between the first output information and the target output information, and an objective function that minimizes an error between an average or a weighted sum of the second output information to the fourth output information and the first output information or the target output information.

Furthermore, the information providing apparatus 10 may learn the model M1 using an objective function for which a predetermined weight coefficient is set for each of indices. For example, the information providing apparatus 10 may set a coefficient of 0.6 for the first index, set a coefficient of 0.3 for the second index, set a coefficient of 0.1 for the third index, and set an objective function indicating a sum of the indices for which the coefficients are set. Moreover, as for the coefficients as described above, different coefficients may be set every time the learning of the model M1 is progressed in a stepwise manner, for example.

When the information providing apparatus 10 sets the cross entropy between the target output information and each of the pieces of intermediate output information as each of the indices, and sets objective functions based on the indices, the information providing apparatus 10 learns the model M1 so as to reduce the values of the objective functions. However, the embodiments are not limited to this example. For example, the information providing apparatus 10 may learn the model M1 so as to increase the values of the objective functions depending on the contents of the set indices.

1-3-4. Progress of Learning Process

In the explanation described above, when the model M1 is to be learned, the first output information to the fourth output information are acquired, a plurality of indices are set using the first output information to the fourth output information acquired as above, and the model M1 is learned in a stepwise manner. In this manner, the information providing apparatus 10 may initially set all of the indices, and learn the model M1 in a stepwise manner while changing the objective functions in a stepwise manner by increasing the set indices in a stepwise manner. In contrast, the information providing apparatus 10 may reset the indices every time the model M1 is learned. In other words, in the case of learning the model M1, the information providing apparatus 10 may set new intermediate information and new indices every time the model M1 is learned in a stepwise manner.

For example, the information providing apparatus 10 inputs input information to the model M1, and acquires the first output information and the second output information. Then, the information providing apparatus 10 sets the first index and the second index from the first output information and the second output information, learns the model ml using the first index, and thereafter learns the model M1 using the first index and the second index.

Subsequently, the information providing apparatus 10 inputs the input information again to the learned model M1, and acquires the first output information, the second output information, and the third output information. Then, the information providing apparatus 10 sets the first index, the second index, and the third index from the pieces of acquired information, learns the model M1 using the first index, subsequently learns the model M1 using the first index and the second index, and thereafter learns the model M1 using all of the first index to the third index.

Furthermore, the information providing apparatus 10 inputs the input information again to the learned model M1, and acquires the first output information to the fourth output information. Then, the information providing apparatus 10 sets the first index, the second index, the third index, and the fourth index from the pieces of acquired information, learns the model M1 using the first index, subsequently learns the model M1 using the first index and the second index, subsequently learns the model M1 using the first index to the third index, and thereafter learns the model M1 using all of the objective functions.

The information providing apparatus 10 may adopt an arbitrary learning process as long as the model M1 is learned while increasing the number of pieces of intermediate output information by increasing the number of pieces of intermediate information to be used in a stepwise manner along with the progress of the learning of the model M1, that is, while eventually increasing the number of objective functions along with the progress of the learning.

For example, the information providing apparatus 10 adopts, as a single unit of the learning process, a series of processes of generating intermediate output information using a plurality of pieces of intermediate information, setting indices using the generated intermediate output information, and learning the model M1 using the set indices. In this case, the information providing apparatus 10 sets new indices and learns the model M1 using the set indices every time the single unit of the learning process is performed.

When the intermediate output information is re-generated every time the learning is performed, the information providing apparatus 10 may change, in each case, an intermediate layer from which the intermediate information is to be acquired. For example, the information providing apparatus 10 first generates the second output information using the intermediate information output by the intermediate block HB6, learns the model M1 using the generated second output information, inputs the input information again to the model M1, generates new second output information using the intermediate information output by the intermediate block HB5, that is, the intermediate information output by the intermediate layer disposed closer to the input layer, and learns the model M1 using the generated new second output information. The information providing apparatus 10 may learn the model M1 by repeating the process as described above.

When the model M1 is to be learned, the connection coefficient may be corrected in order from the output layer side, or the connection coefficient may be corrected in order from the input layer side. In other words, the information providing apparatus 10 is able to adopt an arbitrary learning method as long as a plurality of objective functions are set using the intermediate output information and the model M1 is learned using the plurality of set objective functions in a stepwise manner.

In the explanation described above, the information providing apparatus 10 learns the model M1 in a stepwise manner while increasing, in a stepwise manner, the objective functions that are used for learning among the plurality of set objective functions. However, the embodiments are not limited to this example. For example, when the information providing apparatus 10 sets the first index to the third index, the information providing apparatus 10 may use only the first index for the first learning, use only the second index for the second learning, and use only the third index for the third learning.

1-3-5. Learning Target Range

In the example as described above, the information providing apparatus 10 adopts the input block IB, the intermediate block HB, and the output block OB1 as the learning target range. However, the embodiments are not limited to this example. For example, the information providing apparatus 10 may adopt the extraction blocks AB1 to AB3 and the output blocks OB2 to OB4 as the learning target range.

Further, the information providing apparatus 10 may change the learning target range depending on the intermediate information that serves as a source of the objective function to be used. For example, when performing learning using the first index and the second index, the information providing apparatus 10 identifies the intermediate layer (i.e., the intermediate block HB6) disposed closest to the input layer among the intermediate layers that have output the pieces of intermediate information used for setting the second index (i.e., the pieces of intermediate information used as a source of the second output information). Then, the information providing apparatus 10 may learn a range from the output layer to the identified intermediate layer (for example, from the output block OB1 to the intermediate block HB6) by using the first index and the second index. Further, the information providing apparatus 10 may adopt the output block OB1 to the intermediate block HB4 as the learning target range when learning the model M1 using the first index to the third index.

1-3-6. Model

In the explanation described above, the information providing apparatus 10 learns the model M1 that includes the extraction blocks AB1 to AB3 and the output blocks OB2 to OB4. However, the embodiments are not limited to this example. For example, the information providing apparatus 10 may generate the model M1 that includes the input block IB, the plurality of intermediate blocks HB, and the output block OB1, and acquire the intermediate output information based on the intermediate information output by each of the intermediate blocks HB. In other words, the model M1 to be learned by the information providing apparatus 10 need not include the extraction blocks AB1 to AB3 and the output blocks OB2 to OB4 that are used to acquire the intermediate output information.

Further, each of the intermediate blocks HB included in the model M1 may be a different type of DNN. For example, the model M1 may include the intermediate block HB having a function of a CNN, and the intermediate block HB having a function of an RNN. Furthermore, the model M1 may include the plurality of intermediate blocks HB for which pre-training has been performed based on different indices.

Moreover, the model M1 may include intermediate layers that are arranged in parallel. For example, the model M1 may include the intermediate blocks HB2 and HB3 that generate pieces of new intermediate information based on the intermediate information of the intermediate block HB1, and include the intermediate block HB4 that generates new intermediate information based on the pieces of intermediate information of the intermediate blocks HB2 and HB3. In this case, the information providing apparatus 10 may acquire the intermediate output information by separately using the pieces of intermediate information output by the intermediate blocks HB2 and HB3, or acquire the intermediate output information based on intermediate information that is obtained by synthesizing the pieces of intermediate information output by the intermediate blocks HB2 and HB3.

Input and output of each of the intermediate blocks HB may have the same number of dimensions or different numbers of dimensions. Further, output of each of the intermediate blocks HB may have a different number of dimensions. Even when the number of dimensions of output of each of the intermediate blocks HB is different as described above, it is sufficient to equalize the numbers of dimensions by the intermediate blocks included in the summation block AB.

1-4. Generation Process

The model M1 that has been learned through the learning process as described above is learned in a stepwise manner using a plurality of objective functions; therefore, accuracy of the first output information is improved as compared to the conventional model that uses a single objective function. However, the information providing apparatus 10 may generate corresponding information that corresponds to input information by using not only the first output information but also the intermediate output information, and output the generated corresponding information as a processing result of the model M1.

For example, the information providing apparatus 10 acquires the first output information that is to be output by the output layer when predetermined input information is input to a model that includes an input layer, a plurality of intermediate layers, and the output layer. Further, the information providing apparatus 10 acquires intermediate output information that is based on pieces of intermediate information that are output by the plurality of intermediate layers when the input information is input to the model. Then, the information providing apparatus 10 generates corresponding information that corresponds to the input information based on the first output information and the intermediate output information.

An example of the generation process that is performed by the information providing apparatus 10 using the learned model M1 will be described below with reference to FIG. 2. It is assumed that the model M1 illustrated in FIG. 2 is the model M1 that has been learned through the learning process illustrated in FIG. 1.

For example, the information providing apparatus 10 receives, from the information processing apparatus 200, input information to be processed (Step S1). In this case, the information providing apparatus 10 inputs the received input information to the model M1, and acquires the first output information, which is based on output of the terminal intermediate layer, and the intermediate output information, which is based on output of the plurality of intermediate layers (Step S2). More specifically, the information providing apparatus 10 acquires the first output information output by the output block OB1, and the second output information to the fourth output information output by the output blocks OB2 to OB4.

Then, the information providing apparatus 10 generates corresponding information that corresponds to the received input information based on each piece of the output information (Step S3). For example, the information providing apparatus 10 calculates a weighted average of the first output information to the fourth output information, and generates the corresponding information based on a value of the calculated weighted average. Then, the information providing apparatus 10 outputs the generated corresponding information, as a processing result, to the information processing apparatus 200 (Step S4).

When the process as described above is performed, the information providing apparatus 10 is able to generate corresponding information that corresponds to the input information, on the basis of features that are included in the input information and that have different resolutions. As a result, for example, the information providing apparatus 10 is able to generate the corresponding information corresponding to the input information by taking into account peripheral information or the like of a feature that may be lost in the processes performed by the intermediate layers. Consequently, the information providing apparatus 10 is able to provide the corresponding information with respect to the input information with higher accuracy.

1-5. Variations of Generation Process

In the explanation described above, the information providing apparatus 10 generates the corresponding information based on the weighted average of the first output information to the fourth output information. However, the embodiments are not limited to this example. The information providing apparatus 10 may generate the corresponding information by an arbitrary method as long as the output information is generated by using at least the first output information output by the output layer and the intermediate output information.

For example, in the model M1 configured as illustrated in FIG. 1 and FIG. 2, the fourth output information is information that is based on the intermediate information output by the intermediate layer disposed closest to the input layer and based on the intermediate information output by the intermediate layer disposed closest to the output layer. Therefore, it is assumed that the fourth output information indicates features included in the input information, with use of the largest variety of resolutions. Therefore, the information providing apparatus 10 may generate the corresponding information using only the fourth output information. In other words, the information providing apparatus 10 may acquire a plurality of pieces of intermediate output information based on pieces of intermediate information output by different intermediate layers, and generate the corresponding information based on the intermediate information output by the intermediate layer disposed closest to the input layer among the pieces of intermediate output information. Furthermore, for example, the information providing apparatus 10 may calculate a weighted average of the pieces of intermediate output information while setting a larger weight for the intermediate output information that is based on the intermediate information output by the intermediate layer disposed closer to the input layer, and generate the corresponding information based on the calculated weighted average.

When the information providing apparatus 10 outputs the fourth output information as the corresponding information, the information providing apparatus 10 need not include the output blocks OB1 to OB3. Further, the information providing apparatus 10 may adopt an arbitrary process other than the process as described above, as long as the first output information and the intermediate information are used in combination.

1-6. Application Target

The model M1 may be a model that is aimed at performing an arbitrary process. For example, the model M1 is able to implement, in the learning process, an arbitrary process by setting what kind of information is to be used as the target output information when predetermined input information is input. For example, when the information providing apparatus 10 classifies input information, the information providing apparatus 10 is able to learn the model M1 that classifies the input information, by performing learning such that when input information serving as learning data is input, information that indicates classification of the input information is output as each piece of output information. As the classification, it is possible to adopt classification based on arbitrary criteria to arbitrary contents, such as text, a still image, a moving image, or voice. For example, the model M1 may perform classification for authenticating a face image.

Further, the model M1 may classify input voice. For example, the model M1 may be a model that classifies whether input voice includes human voice (in other words, whether it is a speech period or not), whether input voice includes a predetermined keyword, whether input voice includes voice of a predetermined person, or the like.

For example, the information providing apparatus 10 acquires a first classification result of voice information, which is output by an output layer when the voice information on voice is input to a model that includes an input layer, a plurality of intermediate layers, and the output layer. Further, the information providing apparatus 10 acquires an intermediate classification result that is based on pieces of intermediate information that are output by the plurality of intermediate layers when the voice information is input to the model. Then, the information providing apparatus 10 may perform a classification process of classifying the voice information based on the first classification result and the intermediate classification result. In this manner, the learning process as described above is applicable to learning of the model M1 that implements an arbitrary process, and the generation process as described above is applicable to generation of corresponding information using the model M1 that implements an arbitrary process.

2. Example of Functional Configuration of Information Providing Apparatus

An example of a functional configuration of the information providing apparatus 10 that implements the learning process and the generation process as described above will be described below. FIG. 3 is a diagram illustrating a configuration example of the information providing apparatus according to the embodiment. As illustrated in FIG. 3, the information providing apparatus 10 includes a communication unit 20, a storage unit 30, and a control unit 40.

The communication unit 20 is implemented by, for example, a network interface card (NIC) or the like. The communication unit 20 is connected to a network N in a wired or wireless manner, and transmits and receives, for example, learning data, input information, and corresponding information to and from the information processing apparatuses 100 and 200. For example, upon receiving, as input information, voice acquired by the information processing apparatus 100 via a microphone or the like, the communication unit 20 outputs corresponding information generated through the generation process or the like (for example, information indicating a classification result of the voice serving as the input information) to the information processing apparatus 100.

The storage unit 30 is implemented by, for example, a semiconductor memory device, such as a random access memory (RAM) or a flash memory, or a storage device, such as a hard disk or an optical disk. Further, the storage unit 30 includes a learning data database 31 and a model database 32.

In the learning data database 31, learning data is registered. For example, FIG. 4 is a diagram illustrating an example of information registered in the learning data database according to the embodiment. As illustrated in FIG. 4, information having items, such as a "learning data identifier (ID)", "input information", and "target output information" is registered in the learning data database 31.

In this example, the "learning data ID" is an identifier of learning data. The "input information" is information input to the model M1 when the model M1 is learned, and is, for example, voice data. The "target output information" is the first output information, i.e., the target output information, which is desired to be output by the model M1 when associated input information is input to the model M1.

For example, in the example illustrated in FIG. 4, a learning data ID of "ID #1", input information of "input information #1", and target output information of "target output information #1" are registered in the learning data database 31 in an associated manner. The information as described above indicates that learning data identified by the learning data ID of "ID #1" is a combination of the input information of "input information #1" and the target output information of "target output information #1".

In the example illustrated in FIG. 4, conceptual values such as "input information #1" and "target output information #1" are described; however, in reality, information, such as voice data or image data, is registered as the input information and the target output information in the learning data database 31. In addition, it is possible to register arbitrary information other than the information illustrated in FIG. 4 in the learning data database 31.

Referring back to FIG. 3, the explanation will be continued. In the model database 32, the model M1 is registered. In other words, in the model database 32, data of the model M1 is registered, where the model M1 includes an input layer to which input information is input, a plurality of intermediate layers that sequentially perform a predetermined process on the input information input to the input layer, a first output layer that generates first corresponding information corresponding to the input information on the basis of output of the terminal intermediate layer that performs the process last among the plurality of intermediate layers, and a second output layer that generates second corresponding information corresponding to the input information on the basis of the output of the terminal intermediate layer and output of the intermediate layer other than the terminal intermediate layer among the plurality of intermediate layers. More specifically, data indicating a connection relation between the nodes or data indicating a connection coefficient between the nodes is registered in the model database 32.

In this example, the model M1 includes a first element, which belongs to a certain layer that is disposed between the input layer and the output layer and that is other than the output layer, and a second element, for which a value is calculated based on the first element and a weight of the first element, and causes a computer to perform calculations with respect to information input to the input layer, on the basis of the first element and the weight of the first element by adopting each of elements belonging to each of the layers other than the output layer as the first element, and output, from the output layer, information corresponding to the information input to the input layer.

For example, at the time of learning, the model M1 as described above causes a computer to output the first output information from the output layer when input information is input to the input layer. Further, the model M1 causes a computer to output the intermediate output information based on the pieces of intermediate information output by the intermediate layers. Then, the information providing apparatus 10 sets a plurality of objective functions based on the first output information and the intermediate output information, and corrects the connection coefficient of the model M using the set objective functions.

Further, at the time of measurement, the model M1 causes a computer to output the first output information from the output layer when input information is input to the input layer, and output the intermediate output information based on the pieces of intermediate information output by the intermediate layers. For example, at the time of measurement, the model M1 causes a computer to output, from the output layer, the first classification result and the intermediate classification result as a classification result of voice information when the voice information is input to the input layer. Then, the information providing apparatus 10 generates corresponding information based on the first output information and the intermediate output information.

In this example, when the model M1 is implemented by a neural network, such as a DNN, that includes one or a plurality of intermediate layers, the first element included in each of the models can be regarded as any of the nodes included in the input layer or the intermediate layer, the second element corresponds to a node to which a value is transmitted from the node corresponding to the first element, i.e., a node in a next stage, and the weight of the first element is a weight that is taken into account with respect to the value that is transmitted from the node corresponding to the first element to the node corresponding to the second element, i.e., a connection coefficient.

In this example, the information providing apparatus 10 generates the model M1 for performing the process as described above, using the learning data registered in the learning data database 31. In other words, the learning data registered in the learning data database 31 is data that includes the first elements, which belong to the input layer to which the input information is input, belong to the output layer, and belong to a certain layer that is disposed between the input layer and the output layer and that is other than the output layer, and a second element, for which a value is calculated based on the first element and the weight of the first element, and causes a computer to perform calculations based on the weight that reflects a feature of the input information, and output, from the output layer, output information corresponding to the input information that has been input (for example, a classification result of the input information).

The information providing apparatus 10 performs the generation process and the classification process using the model having an arbitrary structure, such as a neural network as described above. For example, the information providing apparatus 10 detects a voice period by using the model M1 in which a connection coefficient is set such that when voice information is input, information indicating a classification result of the voice information is to be output based on a feature of the voice information.

The control unit 40 is a controller, and is implemented by, for example, causing a processor, such as a central processing unit (CPU) or a micro processing unit (MPU), to execute various programs stored in an internal storage device of the information providing apparatus 10 by using a random access memory (RAM) or the like as a work area. Further, the control unit 40 is a controller, and may be implemented by, for example, an integrated circuit, such as an application specific integrated circuit (ASIC) or a field programmable gate array (FPGA).

Furthermore, through information processing according to the model M stored in the storage unit 30, the control unit 40 performs calculations based on coefficients included in the model M1 (i.e., coefficients corresponding to features learned by the model M1) with respect to input information that has been input to the input layer of the model M1, calculates corresponding information corresponding to the input information that has been input, and outputs the corresponding information from the output layer of the model M1.

As illustrated in FIG. 3, the control unit 40 includes a receiving unit 41, an acquiring unit 42, a learning unit 43, a generating unit 44, and an output unit 45.

The receiving unit 41 receives input information. For example, the receiving unit 41 receives, from the information processing apparatus 100, input information that serves as learning data, and information, i.e., target output information, that is desired to be output from the output layer of the model M1 when the input information is input to the model M1. In this case, the receiving unit 41 registers the received input information and the received target output information in the learning data database 31. Further, upon receiving input information to be processed from the information processing apparatus 200, the receiving unit 41 outputs the received input information to the output unit 45.

The acquiring unit 42 acquires the first output information and each piece of intermediate output information. In the following, functions that are implemented by the acquiring unit 42 when the learning process is performed and when the generation process and the classification process are performed will be described separately. First, a process performed by the acquiring unit 42 at the time of performing the learning process will be described. The acquiring unit 42 acquires the first output information that is to be output by the output layer when predetermined input information is input to the model M1 that includes the input layer, the plurality of intermediate layers, and the output layer. Further, the acquiring unit 42 acquires the intermediate output information that is based on pieces of intermediate information that are output by the plurality of intermediate layers when the input information is input to the model M1.

For example, the acquiring unit 42 performs the learning process at predetermined time intervals. First, the acquiring unit 42 reads, from the model database 32, the model M1 to be learned, and loads the model M1 on the memory. Further, the acquiring unit 42 reads, from the learning data database 31, the input information serving as learning data and the target output information. Then, the acquiring unit 42 inputs the read input information to the input layer of the model M1, and acquires the fourth output information from the first output information output by the model M1. Thereafter, the acquiring unit 42 outputs the target output information, together with the first output information to the fourth output information, to the learning unit 43.

In other words, the acquiring unit 42 acquires the intermediate output information that is based on intermediate information output by a predetermined intermediate layer and based on intermediate information output by a certain intermediate layer that is disposed closer to the input layer than the predetermined intermediate layer among the intermediate layers. Further, the acquiring unit 42 acquires a plurality of pieces of intermediate output information based on the intermediate information output by the predetermined intermediate layer and pieces of intermediate information output by different intermediate layers. For example, the acquiring unit 42 acquires the second output information based on the intermediate information output by the predetermined intermediate layer and based on the intermediate information output by the first intermediate layer that is disposed closer to the input layer than the predetermined intermediate layer. Further, for example, the acquiring unit 42 acquires the third output information based on pieces of intermediate information output by a plurality of intermediate layers that are adopted differently from the layer which output the second output information. Furthermore, the acquiring unit 42 acquires the first output information that is output by the output layer when input information is input to the model that includes, as the plurality of intermediate layers, a plurality of intermediate blocks each having a plurality of intermediate layers.

For example, the acquiring unit 42 acquires the second output information that is based on the pieces of intermediate information output by the intermediate block HB7 and the intermediate block HB6, and the third output information that is based on the intermediate block HB7, the intermediate block HB6, and the intermediate block HB4. Further, the acquiring unit 42 acquires the fourth output information that is based on the intermediate block HB7, the intermediate block HB6, the intermediate block HB4, and the intermediate block HB2. Then, the acquiring unit 42 outputs the second output information to the fourth output information acquired as above to the learning unit 43, together with the first output information and the target output information.

In contrast, when performing the generation process and the classification process, the acquiring unit 42 performs a process as described below. For example, the acquiring unit 42 acquires the first output information that is output by the output layer when predetermined input information is input to the model M1 that includes the input layer, the plurality of intermediate layers, and the output layer. Further, the acquiring unit 42 acquires the intermediate output information that is based on the pieces of intermediate information that are output by the plurality of intermediate layers when the input information is input to the model M1. More specifically, the acquiring unit 42 acquires a plurality of pieces of intermediate output information that are based on pieces of intermediate information output by different intermediate layers.

For example, upon receiving processing target input information that has been received by the receiving unit 41 from the information processing apparatus 200, the acquiring unit 42 inputs the input information to the input layer of the model M1 that is loaded on the memory. Then, the acquiring unit 42 acquires the first output information to the fourth output information output by the model M1, and outputs first output information to the fourth output information acquired as above to the generating unit 44.

When the input information is voice information, such as voice data, and the model M1 is learned so as to classify the voice information, the acquiring unit 42 acquires the first classification result of the voice information, which is output by the output layer when the voice information is input to the model M1. Further, the acquiring unit 42 acquires intermediate classification results (for example, classification results corresponding to the second output information to the fourth output information) that are based on pieces of intermediate information that are output by the plurality of intermediate layers when the voice information is input to the model M1. Then, the acquiring unit 42 outputs the first classification result and the intermediate classification results to the generating unit 44. The acquiring unit 42 may acquire the intermediate output information that is based on the intermediate information output by the terminal intermediate layer, such as the intermediate information output by the intermediate block HB7, even at the time of generation and measurement.

The learning unit 43 learns the model M1 based on the first output information and the intermediate output information. For example, the learning unit 43 sets a plurality of indices based on the first output information and the intermediate output information, and learns the model M1 in a stepwise manner based on the plurality of indices. More specifically, the learning unit 43 learns the model M1 based on the first index that is based on the target output information corresponding to the input information and the first output information. Thereafter, the learning unit 43 learns the model M1 based on the second index that is based on the second output information and the intermediate output information.

In this example, the learning unit 43 learns the model M1 by using the plurality of pieces of intermediate output information in a stepwise manner. For example, the learning unit 43 generates at least the first index based on the first output information, the second index based on the second output information, and the third index based on the third output information, and learns the model M1 in a stepwise manner by using the first index, the second index, and the third index in a stepwise manner. For example, the learning unit 43 performs learning by using the first index, subsequently performs learning by simultaneously using the first index and the second index, and thereafter performs learning by simultaneously using all of the first index to the third index.

In other words, the learning unit 43 learns the model M1 in a stepwise manner based on the first output information, the second output information, and the third output information, which are pieces of the intermediate output information. The learning unit 43 may set arbitrary indices, such as an error or cross entropy with respect to the target output information, as long as a plurality of indices are set based on the intermediate output information.

The generating unit 44 generates corresponding information that corresponds to the input information, on the basis of the first output information and the intermediate output information. For example, upon receiving the first output information to the fourth output information from the acquiring unit 42, the generating unit 44 generates corresponding information based on a weighted sum of the first output information to the fourth output information received as above. The generating unit 44 may generate the corresponding information based on, for example, the intermediate information, such as the fourth output information, that is output by the intermediate layer disposed closest to the input layer among the pieces of intermediate output information.

When performing the classification process, the generating unit 44 acquires four classification results corresponding to the first output information to the fourth output information from the acquiring unit 42. In this case, the generating unit 44 generates the corresponding information indicating a classification result of the voice information, on the basis of an average of the classification results or an intermediate classification result that is based on the intermediate information output by the intermediate layer disposed closest to the input layer. In other words, the generating unit 44 operates as the classification unit that classifies the voice information serving as the input information, on the basis of the first classification result and the intermediate classification result.

The output unit 45 outputs the corresponding information generated by the generating unit 44. For example, the output unit 45 outputs, to the information processing apparatus 200, the corresponding information generated by the generating unit 44, as corresponding information that corresponds to the input information that has been received as a processing target.

3. Example of Accuracy

As one example of the effect of the learning process as described above, an example of accuracy of the model M1, for which the learning process as described above has been performed, will be described below. In the following description, improvement of a word error rate (WER), which is a rate of discrepancy between a word that is recognized by a voice recognition task of TIMIT and an actual word, will be described as one example of the accuracy of the model M1. In the following description, a training set provided with voices of 462 users was used as a standard, and hyper-parameter tuning was performed by a development set provided with voices of 50 users. Further, to measure the accuracy of the model M1 that has been learned, an experiment of measuring the accuracy of the model M1 was performed by employing a test set provided with voices of 24 people who were different from the users whose voices were included in the development set.

In this experiment, a speech waveform that was extracted with a hamming window of 25 milliseconds and at a frame rate of 10 milliseconds was adopted as input information. Furthermore, a 39-dimensional feature vector including a temporal differential coefficient was adopted. Moreover, a 429-dimensional vector was adopted as input and output of an input block, intermediate blocks, and an output block, and nine blocks were set.

Furthermore, in this experiment, telephone voice was analyzed using a Gaussian mixture model-hidden Markov model (GMM-HMM) and cepstral mean normalization. Moreover, the model M1 was learned using a cross entropy objective function. Furthermore, the model M1 was learned using stochastic gradient descent with a momentum of 0.5. Moreover, the learning process was performed five times with a learning rate of 0.1, and thereafter, the learning rate was reduced by 50% every time the learning was performed. In this example, each of the intermediate blocks includes seven intermediate layers, and ReLu was adopted as an activation function in nodes of all of the intermediate layers. Furthermore, dropout was adopted in all of the layers, and a rate of occurrence of dropout was set to 0.2.

Moreover, in the experiment, the learning process as described above was performed in accordance with the various parameters as described above, with respect to a model having a single extraction block, a model having two extraction blocks, and a model having three extraction blocks. Furthermore, as comparative examples, learning was performed with respect to a DNN including seven intermediate blocks for which a 2048-dimensional vector was adopted as input and output, a DNN including seven intermediate blocks for which a 1024-dimensional vector was adopted as input and output, a DNN including seven blocks for which a 1024-dimensional vector was adopted as input and output and a skip connection was adopted, and a DNN including seven blocks for which a 1024-dimensional vector was adopted as input and output and configured to perform a process based on features output by all of the layers.

Values of the WER of each of the models that were learned through the experiment as described above are illustrated in FIG. 5. FIG. 5 is a first diagram illustrating an example of an effect of the learning process according to the embodiment. As illustrated in FIG. 5, the WER of each of the models learned through the learning process as described above, that is, the model having the single extraction block, the model having the two extraction blocks, and the model having the three extraction blocks, is smaller than the WER of each of the models of the comparison examples, that is, the accuracy is improved as compared to the models of the comparative examples.

Furthermore, an experiment was performed in which a bidirectional LSTM (bLSTM) was adopted as the model M1 and the learning process as described above was performed. In this experiment, a model, in which five bLSTM layers were disposed in a preceding stage of the output layer, was adopted as a baseline. Moreover, Tan h was adopted as a non-linear activation function. Furthermore, each of the bLSTM layers includes 256 cells, and the bLSTM layers are connected such that the bLSTM layer on the output layer side and the bLSTM layer on the input layer side are merged. The dropout was adopted in the output layers of all of the bLSTM layers inclusive of the output layer, and a rate of occurrence of the dropout was set to 0.2. Moreover, in the experiment, the learning process as described above was performed in accordance with the various parameters as described above, with respect to a model having a single extraction block and a model having two extraction blocks.

Values of the WER of each of the models that were learned through the experiment as described above are illustrated in FIG. 6. FIG. 6 is a second diagram illustrating an example of the effect of the learning process according to the embodiment. As illustrated in FIG. 6, the WER of each of the models that have been learned through the learning process as described above, that is, the model having the single extraction block and the model having the two extraction blocks, is smaller than the WER of the model serving as the baseline, that is, the accuracy is improved as compared to the model serving as the baseline.

In this manner, the model generated through the learning process as described above is able to reduce the value of the WER as compared to the model that is learned through the conventional process. As a result, the information providing apparatus 10 is able to improve the accuracy of information output by the model by performing the learning process as described above, as compared to the conventional technology.

4. Flow of Process Performed by Information Providing Apparatus

An example of the flow of a process performed by the information providing apparatus 10 will be described below with reference to FIG. 7 and FIG. 8. FIG. 7 is a flowchart illustrating an example of the flow of the learning process performed by the information providing apparatus according to the embodiment. FIG. 8 is a flowchart illustrating an example of the flow of the generation process performed by the information providing apparatus according to the embodiment.

First, an example of the flow of the learning process will be described with reference to FIG. 7. The information providing apparatus 10 first inputs input information of learning data to the model M1 (Step S101). Then, the information providing apparatus 10 acquires first output information that is based on output of the terminal intermediate layer, and intermediate output information that is based on output of the plurality of intermediate layers (Step S102). Further, the information providing apparatus 10 sets a plurality of indices based on the first output information and each piece of the intermediate output information (Step S103). Then, the information providing apparatus 10 learns the model in a stepwise manner while increasing the indices to be used in a stepwise manner (Step S104), and terminates the process.

Next, an example of the flow of the generation process will be described with reference to FIG. 8. For example, the information providing apparatus 10 determines whether the input information has been received from the information processing apparatus 200 (Step S201). If the input information has not been received (Step S201: No), the information providing apparatus 10 waits to receive the input information. If the input information has been received (Step S201: Yes), the information providing apparatus 10 inputs the input information to the model M1, and acquires the first output information and the intermediate output information (Step S202). Further, the information providing apparatus 10 generates corresponding information based on the first output information and the intermediate output information (Step S203). Then, the information providing apparatus 10 outputs the generated corresponding information (Step S204), and terminates the process.

The information providing apparatus 10 is able to perform a classification process by adopting "voice information" as the "input information" and adopting "classification information" as the "output information" when performing the process illustrated in FIG. 8.

5. Modification

One example of the learning process, the generation process, and the classification process performed by the information providing apparatus 10 has been described above. However, the embodiments are not limited to this example. Variations of the process performed by the information providing apparatus 10 will be described below.

5-1. Configuration of Apparatus

Each of the databases 31 and 32 registered in the storage unit 30 may be stored in an external storage server. Further, the information providing apparatus 10 may be implemented by causing a learning server that performs the learning process and a generation server that performs the generation process to operate in cooperation with each other. In this case, it is sufficient that the learning server includes the acquiring unit 42 and the learning unit 43, and the generation server includes the acquiring unit 42 and the generating unit 44.

5-2. Others

Of the processes described in the embodiments, all or part of a process described as being performed automatically may also be performed manually. Alternatively, all or part of a process described as being performed manually may also be performed automatically by known methods. In addition, the processing procedures, specific names, and information including various kinds of data and parameters illustrated in the above-described document and drawings may be arbitrarily changed unless otherwise specified. For example, various kinds of information illustrated in the drawings are not limited to those illustrated in the drawings.

In addition, the components of the apparatuses illustrated in the drawings are functionally conceptual and do not necessarily have to be physically configured in the manner illustrated in the drawings. In other words, specific forms of distribution and integration of the apparatuses are not limited to those illustrated in the drawings, and all or part of the apparatuses may be functionally or physically distributed or integrated in arbitrary units depending on various loads or use conditions.

Furthermore, the embodiments described above may be arbitrarily combined as long as the processes do not conflict with each other.

5-3. Program

The information providing apparatus 10 according to the embodiment described above is implemented by, for example, a computer 1000 having a configuration as illustrated in FIG. 9. FIG. 9 is a diagram illustrating an example of a hardware configuration. The computer 1000 is connected to an output device 1010 and an input device 1020, and includes an arithmetic device 1030, a primary storage device 1040, a secondary storage device 1050, an output interface (IF) 1060, an input IF 1070, and a network IF 1080, all of which are connected to one another via a bus 1090.

The arithmetic device 1030 operates based on a program stored in the primary storage device 1040 or the secondary storage device 1050 or a program read from the input device 1020, and executes various processes. The primary storage device 1040 is a memory device, such as a RAM, that primarily stores therein data to be used by the arithmetic device 1030 for various calculations. The secondary storage device 1050 is a storage device for registering various databases and data to be used by the arithmetic device 1030 for various calculations, and is implemented by a read only memory (ROM), a hard disk drive (HDD), a flash memory, or the like.

The output IF 1060 is an interface for transmitting information, which is to be an output target, to the output device 1010, such as a monitor or a printer, that outputs various kinds of information, and is implemented by, for example, a connector of a certain standard, such as a universal serial bus (USB), a digital visual interface (DVI), or a high definition multimedia interface (HDMI) (registered trademark). The input IF 1070 is an interface for receiving information from any kind of the input device 1020, such as a mouse, a keyboard, or a scanner, and is implemented by, for example, a USB or the like.

The input device 1020 may be a device that reads information from, for example, an optical recording medium, such as a compact disc (CD), a digital versatile disk (DVD), or a phase change rewritable disk (PD), a magneto optical recording medium, such as a magneto-optical disk (MO), a tape medium, a magnetic recording medium, a semiconductor memory, or the like. Further, the input device 1020 may be an external recording medium, such as a USB memory.

The network IF 1080 receives data from other devices via the network N, sends the data to the arithmetic device 1030, and transmits data generated by the arithmetic device 1030 to other devices via the network N.

The arithmetic device 1030 controls the output device 1010 and the input device 1020 via the output IF 1060 and the input IF 1070. For example, the arithmetic device 1030 loads a program from the input device 1020 or the secondary storage device 1050 onto the primary storage device 1040, and executes the loaded program.

For example, when the computer 1000 functions as the information providing apparatus 10, the arithmetic device 1030 of the computer 1000 executes programs and data (for example, the model M1) loaded on the primary storage device 1040, to thereby implement the functions of the control unit 40. The arithmetic device 1030 of the computer 1000 reads the programs and data (for example, the model M1) from the primary storage device 1040 and executes the programs and data. Alternatively, the arithmetic device 1030 may acquire the programs from other devices via the network N.

6. Effects

As described above, the information providing apparatus 10 acquires the first output information that is output by the output layer when predetermined input information is input to the model M1 that includes the input layer, the plurality of intermediate layers, and the output layer. Further, the information providing apparatus 10 acquires intermediate output information that is based on pieces of intermediate information that are output by the plurality of intermediate layers when input information is input to the model M1. Then, the information providing apparatus 10 learns the model M1 based on the first output information and the intermediate output information.

As a result of the process as described above, the information providing apparatus 10 is able to perform learning based on not only the first output information output by the output layer, but also the intermediate output information. As a result of the process as described above, the information providing apparatus 10 is able to learn the model M1 based on a plurality of indices, so that it is possible to improve the accuracy of the model M1.

Furthermore, the information providing apparatus 10 sets a plurality of indices based on the first output information and the intermediate output information, and learns the model M1 in a stepwise manner based on the plurality of indices. For example, the information providing apparatus 10 learns the model M1 based on the first index, which is based on the target output information corresponding to the input information and based on the first output information, and thereafter learns the model M1 based on the second index, which is based on the target output information and the intermediate output information.

Moreover, the information providing apparatus 10 acquires the intermediate output information that is based on the intermediate information output by a predetermined intermediate layer among the intermediate layers and based on the intermediate information output by an intermediate layer that is disposed closer to the input layer than the predetermined intermediate layer. For example, the information providing apparatus 10 acquires a plurality of pieces of intermediate output information based on the intermediate information output by the predetermined intermediate layer and based on pieces of intermediate information output by different intermediate layers.

As a concrete example, the information providing apparatus 10 acquires the second output information based on pieces of intermediate information output by a plurality of intermediate layers, and acquires the third output information based on pieces of intermediate information output by a plurality of intermediate layers that are adopted differently from the layer which output the second output information. Then, the information providing apparatus 10 learns the model M1 in a stepwise manner based on the first output information, the second output information, and the third output information.

For example, the information providing apparatus 10 generates at least the first index that is based on the target output information and the first output information, the second index that is based on the target output information and the second output information, and the third index that is based on the target output information and the third output information, and learns the model M1 in a stepwise manner by using the first index, the second index, and the third index in a stepwise manner. Further, the information providing apparatus 10 learns the model in a stepwise manner while increasing the objective functions to be used among the first index, the second index, and the third index in a stepwise manner.

Through the processes as described above, the information providing apparatus 10 is able to learn, in multiple stages, the model M1 using multi-resolutional features, so that it is possible to improve the accuracy of the model M1.

Furthermore, the information providing apparatus 10 acquires the first output information that is output by the output layer when input information is input to the model M1 that includes, as the plurality of intermediate layers, a plurality of intermediate blocks each having a plurality of intermediate layers. Moreover, the information providing apparatus 10 acquires intermediate output information that is based on intermediate information output by a predetermined intermediate block among the intermediate blocks. Therefore, the information providing apparatus 10 is able to improve the accuracy of the model M1 that includes the plurality of intermediate blocks.

Furthermore, the information providing apparatus 10 acquires the first output information that is output by the output layer when predetermined input information is input to the model M1 that includes the input layer, the plurality of intermediate layers, and the output layer. Moreover, the information providing apparatus 10 acquires the intermediate output information that is based on pieces of intermediate information that are output by the plurality of intermediate layers when the input information is input to the model M1. Then, the information providing apparatus 10 generates corresponding information corresponding to the input information, on the basis of the first output information and the intermediate output information. Therefore, the information providing apparatus 10 is able to generate the corresponding information with higher accuracy, when generating the corresponding information corresponding to the input information using the model M1.

Moreover, for example, the information providing apparatus 10 generates the corresponding information based on the first output information and a weighted sum of pieces of the intermediate output information. Furthermore, for example, the information providing apparatus 10 acquires a plurality of pieces of intermediate output information based on pieces of intermediate information output by different intermediate layers, and generate the corresponding information based on the intermediate information output by the intermediate layer disposed closest to the input layer among the pieces of intermediate output information. Therefore, the information providing apparatus 10 is able to generate the corresponding information with higher accuracy.

Moreover, the information providing apparatus 10 acquires the first classification result of voice information, which is output by the output layer when the voice information on voice is input to the model M1 that includes the input layer, the plurality of intermediate layers, and the output layer. Furthermore, the information providing apparatus 10 acquires an intermediate classification result that is based on pieces of intermediate information that are output by the plurality of intermediate layers when the voice information is input to the model M1. Moreover, the information providing apparatus 10 classifies the voice information based on the first classification result and the intermediate classification result. Therefore, the information providing apparatus 10 is able to improve the classification accuracy of the voice information.

While the embodiments of the present application have been explained in detail above based on the drawings, the embodiments are described by way of example, and the present invention may be embodied in various other forms with various changes or modifications based on knowledge of person skilled in the art, in addition to the embodiments described in this specification.

Furthermore, "a unit" recited in this document may be replaced with "a section, a module, or a means" or "a circuit". For example, the learning unit may be replaced with a detecting means or a detecting circuit.

According to one aspect of the embodiment, it is possible to improve accuracy of output information.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A learning apparatus comprising:
   a first acquiring unit that acquires first output information that is output by an output layer when predetermined input information is input to a model that includes an input layer, a plurality of intermediate layers, and the output layer;
   a second acquiring unit that acquires intermediate output information that is based on pieces of intermediate information that are output by the plurality of intermediate layers when the input information is input to the model; and
   a learning unit that learns the model based on the first output information and the intermediate output information output by an intermediate layer disposed closest to the input layer among the plurality of pieces of intermediate output information.

2. The learning apparatus according to claim 1, wherein the learning unit sets a plurality of indices based on the first output information and the intermediate output information, and learns the model based on the plurality of indices.

3. The learning apparatus according to claim 2, wherein the learning unit learns the model using a first index, which is based on target output information corresponding to the input information and based on the first output information, and thereafter learns the model using a second index, which is based on the target output information and the intermediate output information.

4. The learning apparatus according to claim 1, wherein the second acquiring unit acquires intermediate output information that is based on intermediate information output by a predetermined intermediate layer among the intermediate layers and based on intermediate information output by an intermediate layer that is disposed closer to an input layer than the predetermined intermediate layer.

5. The learning apparatus according to claim 4, wherein the second acquiring unit acquires a plurality of pieces of intermediate output information based on the intermediate information output by the predetermined intermediate layer and based on pieces of intermediate information output by different intermediate layers.

6. The learning apparatus according to claim 4, wherein the second acquiring unit acquires second output information based on pieces of intermediate information output by the plurality of intermediate layers, and acquires third output information based on pieces of intermediate information output by intermediate layers that are adopted differently from the layer which output the second output information, and the learning unit learns the model in a stepwise manner based on the first output information, the second output information, and the third output information.

7. The learning apparatus according to claim 6, wherein the learning unit generates at least a first index that is based on target output information corresponding to the input information and based on the first output information, a second index that is based on the target output information and the second output information, and a third index that is based on the target output information and the third output information, and learns the model in a stepwise manner by using the first index, the second index, and the third index in a stepwise manner.

8. The learning apparatus according to claim 7, wherein the learning unit learns the model in a stepwise manner while increasing the indices to be used among the first index, the second index, and the third index in a stepwise manner.

9. The learning apparatus according to claim 1, wherein
the first acquiring unit acquires first output information that is output by the output layer when the input information is input to a model that includes, as the plurality of intermediate layers, a plurality of intermediate blocks each having a plurality of intermediate layers, and the second acquiring unit acquires intermediate output information that is based on intermediate information that is output by a predetermined intermediate block among the intermediate blocks.

10. A generation apparatus comprising:
a first acquiring unit that acquires first output information that is output by an output layer when predetermined input information is input to a model that includes an input layer, a plurality of intermediate layers, and the output layer;

a second acquiring unit that acquires intermediate output information that is based on pieces of intermediate information that are output by the plurality of intermediate layers when the input information is input to the model; and a generating unit that generates corresponding information corresponding to the input information based on the first output information and the intermediate output information, the intermediate output information being output from an intermediate layer disposed closest to the input layer among the plurality of pieces of intermediate output information.

11. The generation apparatus according to claim 10, wherein the generating unit generates the corresponding information based on the first output information and a weighted sum of pieces of the intermediate output information.

12. The generation apparatus according to claim 11, wherein
the second acquiring unit acquires a plurality of pieces of intermediate output information based on pieces of intermediate information output by different intermediate layers.

13. A classification apparatus comprising:
a first acquiring unit that acquires a first classification result of voice information, which is output by an output layer when the voice information is input to a model that includes an input layer, a plurality of intermediate layers, and the output layer;

a second acquiring unit that acquires an intermediate classification result that is based on pieces of intermediate information that are output by the plurality of intermediate layers when the voice information is input to the model, the output intermediate information being output from an intermediate layer disposed closest to the input layer among the plurality of pieces of intermediate output information; and a classification unit that classifies the voice information based on the first classification result and the intermediate classification result.

14. A learning method implemented by a learning apparatus, the learning method comprising:
first acquiring including acquiring first output information that is output by an output layer when predetermined input information is input to a model that includes an input layer, a plurality of intermediate layers, and the output layer;

second acquiring including acquiring intermediate output information that is based on pieces of intermediate information that are output by the plurality of intermediate layers when the input information is input to the model, the output intermediate information being output from an intermediate layer disposed closest to the input layer among the plurality of pieces of intermediate output information; and learning the model based on the first output information and the intermediate output information.

15. A non-transitory computer-readable recording medium having stored therein a learning program that causes a computer to execute:
first acquiring including acquiring first output information that is output by an output layer when predetermined input information is input to a model that includes an input layer, a plurality of intermediate layers, and the output layer;

second acquiring including acquiring intermediate output information that is based on pieces of intermediate information that are output by the plurality of intermediate layers when the input information is input to the model, the output intermediate information being output from an intermediate layer disposed closest to the input layer among the plurality of pieces of intermediate output information; and learning the model based on the first output information and the intermediate output information.

16. A non-transitory computer-readable recording medium having stored therein a program that causes a computer to execute as a model comprising:
an input layer to which input information is input;
a plurality of intermediate layers that sequentially perform a predetermined process on the input information input to the input layer;

a first output layer that generates first corresponding information corresponding to the input information on the basis of output of a terminal intermediate layer that performs the process last among the plurality of intermediate layers; and a second output layer that generates second corresponding information corresponding to the input information on the basis of output of the terminal intermediate layer and output of an intermediate layer other than the terminal intermediate layer among the plurality of intermediate layers.

* * * * *